United States Patent [19]
Killick et al.

[11] Patent Number: 6,129,773
[45] Date of Patent: Oct. 10, 2000

[54] FUEL BLENDS

[76] Inventors: Robert William Killick, 14 Dallas Street, Mt. Waverley Victoria 3149; Lawrence Harold Parnaby, deceased, late of Blackburn South; by Barbara Anne Parnaby, legal representative, 20 Baratta Street, South Blackburn, Victoria; Peter Ronald Wrigley, 28 Raleigh Street, Blackburn South, Victoria 3130, all of Australia

[21] Appl. No.: 08/840,618

[22] Filed: Apr. 30, 1997

Related U.S. Application Data

[63] Continuation-in-part of application No. 08/586,995, Jan. 16, 1996, abandoned.

[30] Foreign Application Priority Data

Jul. 16, 1993 [AU] Australia ............................... PM 0004

[51] Int. Cl.$^7$ ................................. C10L 1/10; C10L 1/18
[52] U.S. Cl. ................................. 44/388; 44/400; 44/402
[58] Field of Search ............................. 44/388, 401, 402, 44/400

[56] References Cited

U.S. PATENT DOCUMENTS

| | | |
|---|---|---|
| 1,423,049 | 7/1922 | Tunison . |
| 1,423,058 | 7/1922 | Whitaker . |
| 2,236,590 | 4/1941 | Backoff et al. . |
| 2,291,522 | 7/1942 | Backoff et al. . |
| 3,082,070 | 3/1963 | Eckert . |
| 3,667,152 | 6/1972 | Eckert . |
| 3,672,854 | 6/1972 | Rosenwald et al. . |
| 3,817,720 | 6/1974 | Moy et al. . |
| 4,248,182 | 2/1981 | Malec . |
| 4,364,743 | 12/1982 | Erner ......................................... 44/401 |
| 4,405,337 | 9/1983 | Mori . |
| 4,451,266 | 5/1984 | Barclay et al. ........................... 44/402 |
| 4,539,014 | 9/1985 | Sweeney . |
| 4,753,661 | 6/1988 | Nelson . |
| 4,920,691 | 5/1990 | Fainman . |
| 5,203,878 | 4/1993 | Woomer et al. . |

FOREIGN PATENT DOCUMENTS

| | | |
|---|---|---|
| 131778 | 3/1949 | Australia . |
| 77656/81 | 11/1981 | Australia . |
| 17816/83 | 8/1983 | Australia . |
| 22217/83 | 12/1983 | Australia . |
| 0 319 060 | 6/1989 | European Pat. Off. . |
| 2090611 | 7/1982 | United Kingdom . |
| 2090612 | 7/1982 | United Kingdom . |
| 2090613 | 7/1982 | United Kingdom . |
| 89/07637 | 8/1989 | WIPO . |
| 93/24593 | 12/1993 | WIPO . |

*Primary Examiner*—Margaret Medley
*Attorney, Agent, or Firm*—Michael N. Meller; Eugene Lieberstein

[57] ABSTRACT

A fuel additive composition containing ethanol, n-propanol or mixtures thereof together with a non-hydroxy fatty acid and organic ester is described. A miscible fuel blend composition containing the fuel additive composition and diesel oil, gas oil or a mixture thereof, as well as a process for preparing the fuel blend composition is also described.

8 Claims, No Drawings

FUEL BLENDS

This is a continuation-in-part of U.S. Ser. No. 08/586,995 filed Jan. 16, 1996, now abandoned.

FIELD OF THE INVENTION

This invention relates to fuel blend compositions including a hydrocarbon liquid, low-alkyl alcohol and fatty acid and/or organic ester. Additionally, the invention relates to a fuel additive composition including a low-alkyl alcohol and fatty acid and/or organic ester.

BACKGROUND TO THE INVENTION

Diesel oil, due to its cost and availability, continues to be the backbone for industry around the world being the principal fuel for use in trucks, ships, trains, some cars and other automotive equipment and different stationary types of engines. In this respect, it is well recognised that any commercially acceptable diesel or diesel blend must be capable of performing over a range of prevailing climatic conditions and to achieve this it must maintain a single phase. Typically, such single phase must be maintained at temperatures of 0° C. and above.

It is also well recognised that the combustion of diesel fuel in engines can be hazardous to the environment, In particular, the partial combustion of diesel fuel to carbon, carbon monoxide, and nitrogen oxides creates noxious black exhaust gases which are pollutants. This problem is particularly observable in trucks and other automotive vehicles where noxious black exhaust gases can be seen being released into the environment.

Attempts have been made over the years to address the environmental concerns associated with exhaust fumes from engines by using alcohols such as methanol (methyl alcohol) or ethanol (ethyl alcohol) as fuels. Such attempts, for instance, have generally established that 15% of ethanol and 85% diesel oil provides an acceptable burning capacity without the necessity of modifying existing diesel engines.

The problem with using alcohols from methanol up to n-propanol as a fuel in conjunction with diesel oil is that they are immiscible with diesel oil, that is, they cannot be uniformly mixed or blended into one phase without rapid separation into their component parts. Since they cannot be uniformly mixed into one phase and stored for easy use, the components must be mixed just prior to use by, for example, having independent fuel tanks with the components independently pumped and mixed just before the combined fuel is injected into the fuel chamber, Such a system is currently being used in the bus fleet of the Des Moines Transit Authority, Iowa, USA, Alcohols above amyl alcohol are miscible with diesel fuels and therefore the problem does not arise. However, the lower alcohols, especially ethanol, are clearly preferred over such higher alcohols. For example, ethanol is a low cost alcohol which can be derived from natural renewable resources, even from the fermentation of waste streams.

Accordingly, one attempt to address the problem of immiscibility was made to form an emulsion of the diesel oil and ethanol using an emulsifier. An example of this is in Australian Patent No. 544,728 (Apace Research Ltd) which discloses a composition having 84.5% diesel oil, 15% hydrated ethanol and 0.5% emulsifier. The emulsifier is of the styrene butadiene co-polymer type in admixture with a high molecular weight polyethylene glycol dissolved in xylene. This mixture can show both batch to batch variation and instability as the diesel and ethanol separate in the fuel tank.

An attempt has also been made to address the problem of immiscibility by forming a blend comprising a petroleum fuel, methanol and a higher alcohol having 10–16 carbon atoms as a solvent for the petroleum fuel and methanol. An example of this is disclosed in U.S. Pat. No. 4,527,995 (Itow), A further attempt to address the problem of immiscibility is disclosed in UK Patent No. 2,090,61 1 (Guibet) where combustible compositions contain gas oils, methanol and a fatty acid ester for use in diesel engines. It refers to the use of other heavier alcohols to assist the miscibility of methanol in gas oil but observes that these are commercially unacceptable. The use of fatty acid esters is proposed to overcome the immiscibility between methanol and gas oil. From the examples, the percentage of fatty acid ester required to solubilize methanol is always significantly in excess of the percentage of methanol.

The article entitled "Diesel Oil Substitution by Processed Plant Oils—Engine and Vehicle Results" published in 1982 by two authors from Volkswagon do Brasil S.A. Brazil, compares tests conducted using a straight methyl ester of soya bean oil (MESO) as a fuel with a 75–25 gas oil-MESO blend and a 68–23–9 gas oil-MESO-ethanol (anhydrous) blend. The article provides that plant-oil mono-esters used as gas oil extenders serve as co-solvents between gas oil and ethanol, thus permitting ready use of otherwise-incompatible ethanol. However, the article provides that an increase in proportion of ester in the gas oil from a 20 to 25% ester content onwards results In the ethanol being substantially compatible in the gas oil. Therefore, a significantly greater amount of ester than ethanol is necessary to achieve a miscible composition.

Another fuel composition is disclosed in the 1920's U.S. Pat. No. 1,423,049 (Tunison). This patent discloses a fuel mixture of petroleum distillate (heavier than kerosene) and an ester of an organic acid and a mono-hydric alcohol, In a preferred form, alcohol is added although in the rest of the specification there is no working example or other explanation of specific alcohols. The prime interest of this patent is the incorporation of the ester of an organic acid and of the mono-hydric alcohol. The volatile which may be present may be alcohol or other volatile eg. ketones. The specification states that a wide range of alcohols are miscible with the heavy oil. However, it is well known that alcohols from methanol to n-propanol are immiscible with today's diesel oil and/or gas oil. It would seem that the heavy oil specified is not the diesel oil of today and the patent is not directed to the particular immiscibility problems of methanol to n-propanol with diesel oil and gas oil.

An attempt at substantially substituting alcohols for diesel fuel is disclosed in U.S. Pat. No. 4,405,337 (Mori). This patent specifies castor oil, which is the only hydroxy fatty acid based vegetable oil, as the means which permits the maximisation of the use of alcohol in the fuel and minimisation of the gas oil volume. The patent also teaches that only castor oil can be mentioned as a vegetable oil capable of dissolving alcohols therein. Castor oil is A triglyceride and each fatty acid chain contains a hydroxyl group which may be the reason for it assisting the solubility of ethanol in itself and thence in diesel fuel.

In subsequent investigations leading to the present invention, it has surprisingly been found that the hydrocarbon liquid and ethanol and/or n-propanol can be caused to form a single phase composition which is not prone to separation. In particular, it has been found that non-hydroxy fatty acids and/or organic esters having up to 15% by volume in the fuel blend composition can function as coupling agents between these compounds.

SUMMARY OF THE INVENTION

According to a first embodiment of the invention, a miscible fuel blend composition is provided comprising:
(a) at least about 65% by volume of the total composition of a hydrocarbon liquid selected from the group of diesel oil, gas oil and mixtures thereof,
(b) not in excess of about –20% by volume of the total composition of ethanol and/or n-propanol; and
(c) not in excess of about 15% by volume of the total composition of a non-hydroxy fatty acid and/or organic ester,
wherein the ethanol and/or n-propanol and the non-hydroxy fatty acid and/or organic ester are present in respective amounts ranging from a ratio of about 25:1 to about 1:1.

In one embodiment of the invention, the fatty acid and/or organic ester component is between about 1.5% and about 11% by volume. In another embodiment of the invention, the fatty acid and/or organic ester component is between about 2% and about 5% by volume. However, it will be understood that for low alcohol levels, smaller quantities are applicable.

The fatty acid is derived preferably from natural oils and fats or synthetic oils or any mixtures thereof such as lard, tallow and vegetable oils, for example, canola, palm, corn, sunflower and soya bean oils or from specific blends commercially produced by fatty acid manufacturers or from fatty acids made by synthetic means or mixtures thereof. For those skilled in the art, this is understood to mean the commercially available liquid fatty acids and in the examples is called "oleic acid".

The organic ester component is selected preferably from fatty esters, such as ethyl oleate, ethyl tallowate, iso-propyl oleate, butyl oleate, methyl oleate or methyl cocoate and/or other aromatic esters such as butyl benzoate and/or other aliphatic esters such as ethyl acetate or mixtures thereof and/or dicarboxylic acid esters such as dioctyl maleate. It will be readily understood by those skilled in the art that the term "oleate" as used in the examples herein includes oleates derived from for example, canola, palm, corn, sunflower and soya bean oil. In a preferred embodiment of the invention, the hydrocarbon liquid component is between about 75% and 85% by volume of the total composition.

The miscible fuel blend composition may further comprise methanol, iso-propanol, butanol, iso-butanol, tertiary butanol and mixtures thereof.

In another aspect of the invention there is provided a process for producing the single phase fuel blend composition comprising the steps of:
(a) adding the ethanol and/or n-propanol alcohol to the hydrocarbon liquid to form an alcohol phase and an oil phase; thereafter
(b) adding the mixture of step (a) to the fatty acid and/or organic ester; and
(c) mixing the resultant mixture until a single phase is formed.

Notwithstanding the above, the more preferred process for producing the single phase fuel blend composition comprises the steps of:
(a) adding the ethanol and/or n-propanol to the fatty acid and/or organic ester; thereafter
(b) adding the mixture of step(a) to the hydrocarbon liquid; and
(c) mixing the resultant mixture until a single phase is formed.

In yet another aspect of the invention, a fuel additive composition for and miscible with a hydrocarbon selected from diesel oil and gas oil or mixtures thereof is provided comprising ethanol and/or n-propanol and a non-hydroxy fatty acid and/or organic ester in respective amounts ranging from a ratio of about 25:1 to about 1:1.

The term "hydrocarbon liquid", as used in the specification, means diesel oil and gas oil and mixtures thereof.

EXAMPLES

The carboxylate esters used in the examples are those manufactured at the premises of the Victorian Chemical Co., Richmond, Victoria, Australia and are sold under the "Esterol" brand name. The ethyl acetate was purchased from BP Chemicals Australia. The diesel oil is that purchased from pumps of major Australian oil companies such as Caltex Petroleum Pty Ltd. The ethanol (ethyl alcohol) is commercial material obtained from the CSR Distilleries, Yarraville Victoria, Australia and is known as Ethanol 100SG/F3 which contains 3% methanol. This ethanol has a water content of 0.5% maximum.

The following is a non-limiting example of a process to produce Composition 1 below according to the invention.

Diesel oil (85 ml) is placed in a 100 ml bottle at ambient temperature and pressure. Ethanol (10.0 ml) is added to the bottle creating an oil phase and an alcohol phase. Methyl oleate (5.0 ml) is then added, a stopper applied to the top of the bottle and the resultant mixture is shaken for a period of approximately 30 seconds or such less or further period of time to allow proper mixing of the liquids to take place and a single phase to form. The mixture was allowed to stand to allow the contents to settle. A single phase is observed.

The following is a non-limiting example of a process to produce Composition 2 below according to the invention.

To n-propyl (13.5 ml) is added methanol (1.5 ml) and ethyl Oleate (5 ml) which with minimal stirring form one phase. This is added to diesel oil (85 ml) in a 100 ml bottle at ambient temperature and pressure, and with minimal stirring the liquids form a single phase.

Substantially either method is used to produce the other compositions detailed below. Product blends were made (as percentage v/v) as follows.

| Composition 1 | |
|---|---|
| Diesel Oil | 85.0 |
| Ethanol | 10.0 |
| Methyl Oleate | 5.0 |
| | 100.0 |
| Composition 2 | |
| Diesel Oil | 80.0 |
| n-Propanol | 13.5 |
| Methanol | 1.5 |
| Ethyl Oleate | 5.0 |
| | 100.0 |
| Composition 3 | |
| Diesel Oil | 80.0 |
| Ethanol | 15.0 |
| Ethyl Acetate | 5.0 |
| | 100.0 |
| Composition 4 | |
| Diesel Oil | 80.0 |

| | |
|---|---|
| Ethanol | 15.0 |
| Ethyl Tallowate | 5.0 |
| | 100.0 |
| Composition 5 | |
| Diesel Oil | 82.0 |
| Ethanol | 15.0 |
| Butyl Benzoate | 3.0 |
| | 100.0 |
| Composition 6 | |
| Diesel Oil | 82.0 |
| Ethanol | 15.0 |
| Oleic Acid | 3.0 |
| | 100.0 |
| Composition 7 | |
| Diesel Oil | 83.0 |
| Ethanol | 13.5 |
| Iso-Propanol | 1.5 |
| Ethyl Oleate | 2.0 |
| | 100.0 |
| Composition 8 | |
| Diesel Oil | 81.0 |
| Ethanol | 15.0 |
| Ethyl Tallowate | 1.5 |
| Ethyl Acetate | 2.5 |
| | 100.0 |
| Composition 9 | |
| Diesel Oil | 80.0 |
| Ethanol | 14.0 |
| Methanol | 1.0 |
| Ethyl Oleate | 4.0 |
| Butyl Benzoate | 1.0 |
| | 100.0 |
| Composition 10 | |
| Gas Oil | 74.5 |
| Ethanol | 20.0 |
| Oleic Acid | 3.0 |
| Iso-Propyl Oleate | 2.5 |
| | 100.0 |
| Composition 11 | |
| Diesel Oil | 87.75 |
| Ethanol | 9.00 |
| Ethyl Oleate | 3.25 |
| | 100.00 |
| Composition 12 | |
| Diesel Oil | 94.0 |
| Ethanol | 5.0 |
| Ethyl Oleate | 1.0 |
| | 100.0 |
| Composition 13 | |
| Diesel Oil | 94.5 |
| Ethanol | 5.0 |
| Ethyl Oleate | 0.5 |
| | 100.0 |
| Composition 14 | |
| Diesel Oil | 94.8 |
| Ethanol | 5.0 |
| Ethyl Oleate | 0.2 |
| | 100.0 |
| Composition 15 | |
| Diesel Oil | 80.0 |
| Ethanol | 10.0 |
| n-Butanol | 5.0 |
| Ethyl Oleate | 5.0 |
| | 100.0 |
| Composition 16 | |
| Diesel Oil | 79.0 |
| Ethanol | 10.0 |
| Ethyl Oleate | 6.0 |
| Iso-Propanol | 5.0 |
| | 100.0 |
| Composition 17 | |
| Diesel Oil | 74.0 |
| Ethanol | 15.0 |
| Ethyl Oleate | 11.0 |
| | 100.0 |
| Composition 18 | |
| Diesel Oil | 94.8 |
| Ethanol | 5.0 |
| Oleic Acid | 0.2 |
| | 100.0 |
| Composition 19 | |
| Diesel Oil | 94.0 |
| Ethanol | 5.0 |
| Oleic Acid | 1.0 |
| | 100.0 |
| Composition 20 | |
| Diesel Oil | 88.5 |
| Ethanol | 10.0 |
| Oleic Acid | 1.5 |
| | 100.0 |
| Composition 21 | |
| Diesel Oil | 82.0 |
| Ethanol | 15.0 |
| Oleic Acid | 3.0 |
| | 100.0 |
| Composition 22 | |
| Diesel Oil | 81.5 |
| Ethanol | 15.0 |
| Oleic Acid | 3.5 |
| | 100.0 |
| Composition 23 | |
| Diesel Oil | 76.0 |
| Ethanol | 20.0 |
| Oleic Acid | 4.0 |
| | 100.0 |
| Composition 24 | |
| Diesel Oil | 74.5 |
| Ethanol | 20.0 |
| Oleic Acid | 3.0 |
| Isopropyl Oleate | 2.5 |
| | 100.0 |
| Composition 25 | |
| Diesel Oil | 70.0 |
| Ethanol | 15.0 |

-continued

| | |
|---|---|
| Methyl Cocoate | 15.0 |
| | 100.0 |
| Composition 26 | |
| Diesel Oil | 77.0 |
| Ethanol | 15.0 |
| Methyl Cocoate | 8.0 |
| | 100.0 |
| Composition 27 | |
| Diesel Oil | 75.0 |
| Ethanol | 15.0 |
| Methyl Cocoate | 10.0 |
| | 100.0 |
| Composition 28 | |
| Diesel Oil | 78.5 |
| Ethanol | 0.5 |
| n-Propanol | 14.5 |
| Ethyl Oleate | 6.5 |
| | 100.0 |
| Composition 29 | |
| Diesel Oil | 81.5 |
| Ethanol | 15.0 |
| Ethyl Oleate | 3.5 |
| | 100.0 |
| Composition 30 | |
| Diesel Oil | 77.5 |
| Ethanol | 15.0 |
| Ethyl Oleate | 5.0 |
| Ethyl Acetate | 2.5 |
| | 100.0 |
| Composition 31 | |
| Diesel Oil | 77.0 |
| Ethanol | 15.0 |
| Dioctyl maleate | 8.0 |
| | 100.0 |
| Composition 32 | |
| Diesel Oil | 65.0 |
| Ethanol | 20.0 |
| Ethyl Oleate | 15.0 |
| | 100.0 |
| Composition 33 | |
| Diesel Oil | 67.0 |
| Ethanol | 18.0 |
| Ethyl Oleate | 15.0 |
| | 100.0 |

All of the above Compositions (1–33) had a single phase demonstrating the effectiveness of the use of non-hydroxy fatty acids and/or organic esters or mixtures thereof to blend hydrocarbon liquids such as diesel oil and low-alkyl alcohols such as ethanol into one phase.

These compositions were tested at two temperatures (0° C. and 20° C.) which reflect typical operating temperatures for normal fuels and were not found to be temperature sensitive.

In each of the Compositions listed above, the blend of diesel oil and low alkyl alcohol is in one phase and the blend was found to operate satisfactorily as a fuel.

A further set of tests were carried out using Compositions 1–33 (above) but substituting n-propanol or methanol for the ethanol previously stated.

| Composition 1 (variation) | | |
|---|---|---|
| Diesel | 85 | 85 |
| Methanol | 10 | 0 |
| n-Propanol | 0 | 10 |
| Methyl Oleate | 5 | 5 |
| Layers at 20° C. | 2 | 1 |
| Layers at 0° C. | 2 | 1 |

| Composition 2 (variation) | | |
|---|---|---|
| Diesel | 80.0 | 80.0 |
| n-Propanol | 1.5 | 13.5 |
| Methanol | 13.5 | 1.5 |
| Ethyl Oleate | 5.0 | 5.0 |
| Layers at 20° C. | 2 | 1 |
| Layers at 0° C. | 2 | 1 |

| Composition 3 (variation) | | |
|---|---|---|
| Diesel | 80 | 80 |
| Methanol | 15 | 0 |
| n-Propanol | 0 | 15 |
| Ethyl Acetate | 5 | 5 |
| Layers at 20° C. | 2 | 1 |
| Layers at 0° C. | 2 | 1 |

| Composition 4 (variation) | | |
|---|---|---|
| Diesel | 80 | 80 |
| Methanol | 15 | 0 |
| n-Propanol | 0 | 15 |
| Ethyl tallowate | 5 | 5 |
| Layers at 20° C. | 2 | 1 |
| Layers at 0° C. | 2 | 1 |

| Composition 5 (variation) | | |
|---|---|---|
| Diesel | 82 | 82 |
| Methanol | 15 | 0 |
| n-Propanol | 0 | 15 |
| Butyl Benzoate | 3 | 3 |
| Layers at 20° C. | 2 | 1 |
| Layers at 0° C. | 2 | 1 |

| Composition 6 (variation) | | |
|---|---|---|
| Diesel | 82 | 82 |
| Methanol | 15 | 0 |
| n-Propanol | 0 | 15 |
| Oleic Acid | 3 | 3 |
| Layers at 20° C. | 2 | 1 |
| Layers at 0° C. | 2 | 1 |

| Composition 7 (variation) | | |
|---|---|---|
| Diesel | 83.0 | 83.0 |
| Methanol | 13.5 | 0.0 |
| n-Propanol | 1.5 | 15.0 |
| Ethyl Oleate | 2.0 | 2.0 |
| Layers at 20° C. | 2 | 1 |
| Layers at 0° C. | 2 | 1 |

| Composition 8 (variation) | | |
|---|---|---|
| Diesel | 81.0 | 81.0 |
| Methanol | 15.0 | 0.0 |
| n-Propanol | 0.0 | 15.0 |
| Ethyl Tallowate | 1.5 | 1.5 |
| Ethyl Acetate | 2.5 | 2.5 |
| Layers at 20° C. | 2 | 1 |
| Layers at 0° C. | 2 | 1 |

| Composition 9 (variation) | | |
|---|---|---|
| Diesel | 80 | 80 |
| Methanol | 15 | 1 |
| n-Propanol | 0 | 14 |
| Ethyl Oleate | 4 | 4 |
| Butyl Benzoate | 1 | 1 |
| Layers at 20° C. | 2 | 1 |
| Layers at 0° C. | 2 | 1 |

-continued

| Composition 10 (variation) | | |
|---|---|---|
| Gas oil (Certrex 70) | 74.5 | 74.5 |
| Methanol | 20.0 | 0.0 |
| n-Propanol | 0.0 | 20.0 |
| Oleic Acid | 3.0 | 3.0 |
| Iso-propyl Oleate | 2.5 | 2.5 |
| Layers at 20° C. | 2 | 1 |
| Layers at 0° C. | 2 | 1 |
| Composition 11 (variation) | | |
| Diesel | 87.75 | 87.75 |
| Methanol | 9.00 | 0.00 |
| n-Propanol | 0.00 | 9.00 |
| Ethyl Oleate | 3.25 | 3.25 |
| Layers at 20° C. | 2 | 1 |
| Layers at 0° C. | 2 | 1 |
| Composition 12 (variation) | | |
| Diesel | 94 | 94 |
| Methanol | 5 | 0 |
| n-Propanol | 0 | 5 |
| Ethyl Oleate | 1 | 1 |
| Layers at 20° C. | 2 | 1 |
| Layers at 0° C. | 2 | 1 |
| Composition 13 (variation) | | |
| Diesel | 94.5 | 94.5 |
| Methanol | 5.0 | 0.0 |
| n-Propanol | 0.0 | 5.0 |
| Ethyl Oleate | 0.5 | 0.5 |
| Layers at 20° C. | 2 | 1 |
| Layers at 0° C. | 2 | 1 |
| Composition 14 (variation) | | |
| Diesel | 94.8 | 94.8 |
| Methanol | 5.0 | 0.0 |
| n-Propanol | 0.0 | 5.0 |
| Ethyl Oleate | 0.2 | 0.2 |
| Layers at 20° C. | 2 | 1 |
| Layers at 0° C. | 2 | 1 |
| Composition 15 (variation) | | |
| Diesel | 80 | 80 |
| Methanol | 10 | 0 |
| n-Propanol | 0 | 10 |
| Ethyl Oleate | 5 | 5 |
| n-Butanol | 5 | 5 |
| Layers at 20° C. | 2 | 1 |
| Layers at 0° C. | 2 | 1 |
| Composition 16 (variation) | | |
| Diesel | 79 | 79 |
| Methanol | 10 | 0 |
| n-Propanol | 0 | 10 |
| Ethyl Oleate | 6 | 6 |
| Iso-Propanol | 5 | 5 |
| Layers at 20° C. | 2 | 1 |
| Layers at 0° C. | 2 | 1 |
| Composition 17 (variation) | | |
| Diesel | 74 | 74 |
| Methanol | 15 | 0 |
| n-Propanol | 0 | 15 |
| Ethyl Oleate | 11 | 11 |
| Layers at 20° C. | 2 | 1 |
| Layers at 0° C. | 2 | 1 |
| Composition 18 (variation) | | |
| Diesel | 94.8 | 94.8 |
| Methanol | 5.0 | 0.0 |
| n-Propanol | 0.0 | 5.0 |
| Oleic acid | 0.2 | 0.2 |
| Layers at 20° C. | 2 | 1 |
| Layers at 0° C. | 2 | 1 |
| Composition 19 (variation) | | |
| Diesel | 94 | 94 |
| Methanol | 5 | 0 |

-continued

| | | |
|---|---|---|
| n-Propanol | 0 | 5 |
| Oleic acid | 1 | 1 |
| Layers at 20° C. | 2 | 1 |
| Layers at 0° C. | 2 | 1 |
| Composition 20 (variation) | | |
| Diesel | 88.5 | 88.5 |
| Methanol | 10.0 | 0.0 |
| n-Propanol | 0.0 | 10.0 |
| Oleic acid | 1.5 | 1.5 |
| Layers at 20° C. | 2 | 1 |
| Layers at 0° C. | 2 | 1 |
| Composition 21 (variation) | | |
| Diesel | 82 | 82 |
| Methanol | 15 | 0 |
| n-Propanol | 0 | 15 |
| Oleic acid | 3 | 3 |
| Layers at 20° C. | 2 | 1 |
| Layers at 0° C. | 2 | 1 |
| Composition 22 (variation) | | |
| Diesel | 81.5 | 81.5 |
| Methanol | 15.0 | 0.0 |
| n-Propanol | 0.0 | 15.0 |
| Oleic acid | 3.5 | 3.5 |
| Layers at 20° C. | 2 | 1 |
| Layers at 0° C. | 2 | 1 |
| Composition 23 (variation) | | |
| Diesel | 76 | 76 |
| Methanol | 20 | 0 |
| n-Propanol | 0 | 20 |
| Oleic acid | 4 | 4 |
| Layers at 20° C. | 2 | 1 |
| Layers at 0° C. | 2 | 1 |
| Composition 24 (variation) | | |
| Diesel | 74.5 | 74.5 |
| Methanol | 20.0 | 0.0 |
| n-Propanol | 0.0 | 20.0 |
| Oleic acid | 3.0 | 3.0 |
| Iso-propyl Oleate | 2.5 | 2.5 |
| Layers at 20° C. | 2 | 1 |
| Layers at 0° C. | 2 | 1 |
| Composition 25 (variation) | | |
| Diesel | 70 | 70 |
| Methanol | 15 | 0 |
| n-Propanol | 0 | 15 |
| Methyl Cocoate | 15 | 15 |
| Layers at 20° C. | 2 | 1 |
| Layers at 0° C. | 2 | 1 |
| Composition 26 (variation) | | |
| Diesel | 77 | 77 |
| Methanol | 15 | 0 |
| n-Propanol | 0 | 15 |
| Methyl Cocoate | 8 | 8 |
| Layers at 20° C. | 2 | 1 |
| Layers at 0° C. | 2 | 1 |
| Composition 27 (variation) | | |
| Diesel | 75 | 75 |
| Methanol | 15 | 0 |
| n-Propanol | 0 | 15 |
| Methyl Cocoate | 10 | 10 |
| Layers at 20° C. | 2 | 1 |
| Layers at 0° C. | 2 | 1 |
| Composition 28 (variation) | | |
| Diesel | 78.5 | 78.5 |
| n-Propanol | 14.5 | 15.0 |
| Methanol | 0.5 | 0.0 |
| Ethyl Oleate | 6.5 | 6.5 |
| Layers at 20° C. | 1 | 1 |
| Layers at 0° C. | 1 | 1 |

-continued

| Composition 29 (variation) | | |
|---|---|---|
| Diesel | 81.5 | 81.5 |
| Methanol | 15.0 | 0.0 |
| n-Propanol | 0.0 | 15.0 |
| Ethyl Oleate | 3.5 | 3.5 |
| Layers at 20° C. | 2 | 1 |
| Layers at 0° C. | 2 | 1 |
| Composition 30 (variation) | | |
| Diesel | 77.5 | 77.5 |
| Methanol | 15.0 | 0.0 |
| n-Propanol | 0.0 | 15.0 |
| Ethyl Oleate | 5.0 | 5.0 |
| Ethyl Acetate | 2.5 | 2.5 |
| Layers at 20° C. | 2 | 1 |
| Layer at 0° C. | 2 | 1 |
| Composition 31 (variation) | | |
| Diesel | 77 | 77 |
| Methanol | 15 | 0 |
| n-Propanol | 0 | 15 |
| Dioctyl Maleate | 8 | 8 |
| Layers at 20° C. | 2 | 1 |
| Layers at 0° C. | 2 | 1 |
| Composition 32 (variation) | | |
| Diesel | 65 | 65 |
| Methanol | 20 | 0 |
| n-Propanol | 0 | 20 |
| Ethyl Oleate | 15 | 15 |
| Layers at 20° C. | 2 | 1 |
| Layers at 0° C. | 2 | 1 |
| Composition 33 (variation) | | |
| Diesel | 67 | 67 |
| Methanol | 18 | 0 |
| n-Propanol | 0 | 18 |
| Ethyl Oleate | 15 | 15 |
| Layers at 20° C. | 2 | 1 |
| Layers at 0° C. | 2 | 1 |

With one exception, the substitution of methanol for ethanol resulted in immiscible fuel blends. That exception being Composition 28, was miscible as it also included n-propanol. All the tests using n-propanol were miscible.

A further set of examples have been performed in view of the Mori patent aforementioned. Specifically these test the miscibility of diesel and ethanol in the presence of castor oil as a coupling agent.

| Diesel | 98.5 | 78.5 | 65.0 | 30.0 |
|---|---|---|---|---|
| Ethanol | 0.0 | 20.0 | 20.0 | 50.0 |
| Castor Oil | 1.5 | 1.5 | 15.0 | 20.0 |
| Layers at 20° C. | 2 | 2 | 2 | 1 |

It was apparent that for castor oil to act as a coupling agent and to result in miscible compositions, a larger amount of ethanol compared with diesel was required. Once this relativity became less the compositions were immiscible.

Volkswagon Engine: A 1979 Volkswagon "Golf 4 cylinder 1.5 liter diesel engine" was tested over the several months on Composition No 15. The engine was tested under normal operating conditions and no decrease in either power or fuel efficiency was noticed.

Prime Mover Engine: A modern Mercedes Bent Prime Mover Engine Type 2228V Series was tested on Composition No 4, under typical 40 tonne loads. There was no noticeable decrease in either power or fuel efficiency of the engine.

Fork Lift Engine: A 4 cylinder Yale Forklift (Model GDP 050 RUAS) (with a) 44EP (2400 20 rpm) Mazda XA series diesel motor engine was tested under typical warehouse operating conditions on Composition Nos 15 and 21 over several months. As well as no difference being noted in the efficiency of the forklift engine, the use of the ethanol blend is likely to be more acceptable in the enclosed warehouse atmosphere.

In respect of each of the above compositions, a fuel additive composition can be formed of the low-alkyl alcohol and the fatty acid and/or organic ester which may be added to the hydrocarbon liquids, Fuel Additive Compositions The Additive Composition is illustrated by the following non-limiting examples. The following is a non-limiting example of a process to produce Additive Composition 1 below according to the invention.

Ethanol (66.7 ml) is placed in a 100 ml bottle at ambient temperature and pressure. Methyl Oleate (33.3 ml) is added to the bottle to form a clear Additive Composition 1. Additive Composition 1 (15 ml) is then added to diesel oil (85 ml), a stopper applied to the top of the bottle and the resultant mixture is shaken for a period of approximately 30 seconds or less or for the period of time to allow proper mixing of the liquids to take place and a single phase to form.

Substantially the same method is used to produce other Additive Compositions as detailed below.

Additive Compositions were made (as percentages v—v) as follows:

| Additive Composition 1 | |
|---|---|
| Ethanol | 66.7 |
| Methyl Oleate | 33.3 |
| | 100.0 |

Additive Composition 1 (15 ml) was added to diesel oil (85 ml).

| Additive Composition 2 | |
|---|---|
| Ethanol | 75 |
| Ethyl Tallowate | 25 |
| | 100.0 |

Additive Composition 2 (20 ml) was added to diesel oil (80 ml).

| Additive Composition 3 | |
|---|---|
| Ethanol | 79.4 |
| Iso Propanol | 8.8 |
| Ethyl Oleate | 11.8 |
| | 100.0 |

Additive Composition 3 (17 ml) was added to diesel oil (83 ml).

| Additive Composition 4 | |
|---|---|
| Ethanol | 78.9 |
| Ethyl Acetate | 13.2 |
| Ethyl Tallowate | 7.9 |
| | 100.0 |

Additive Composition 4 (19 ml) was added to diesel oil (81 ml).

| Additive Composition 5 | |
|---|---|
| Ethanol | 50 |
| n Butanol | 25 |
| Ethyl Oleate | 25 |
| | 100 |

Additive Composition 5 (20 ml) was added to diesel oil (80 ml).

| Additive Composition 6 | |
|---|---|
| Ethanol | 83.3 |

-continued

| | |
|---|---|
| Oleic Acid | 16.7 |
| | 100.0 |

Additive Composition 6 (24 ml) was added to diesel oil (76 ml).

Additive Composition 7

| | |
|---|---|
| Ethanol | 78.4 |
| Iso Propyl Oleate | 9.8 |
| Oleic Acid | 11.8 |
| | 100.0 |

Additive Composition 7 (25.5 ml) was added to diesel oil (74.5 ml).

Additive Composition 8

| | |
|---|---|
| Ethanol | 50 |
| Methyl Cocoate | 50 |
| | 100 |

Additive Composition 8 (30 ml) was added to diesel oil (70 ml).

Additive Composition 9

| | |
|---|---|
| Ethanol | 66.7 |
| Ethyl Acetate | 11.1 |
| Ethyl Oleate | 22.2 |
| | 100.0 |

Additive Composition 9 (22.5 ml) was added to diesel oil (77.5 ml).

Additive Composition 10

| | |
|---|---|
| Ethanol | 57.2 |
| Ethyl Oleate | 42.8 |
| | 100.0 |

Additive Composition 10 (35 ml) was added to diesel oil (65 ml).

The resultant mixtures were allowed to stand to allow the contents to settle. All of the resultant mixtures had a single phase throughout the typical temperature range (0° C. to 20° C.) in which normal fuels are to perform and were found not to be temperature sensitive.

We claim:

1. A miscible one phase fuel blend composition consisting essentially of:
   a) at least 65% by volume of the total composition of a hydrocarbon liquid selected from the group consisting of diesel oil, gas oil and mixtures thereof;
   b) not in excess of 20% by volume of the total composition of an alcohol component selected from the group consisting of ethanol, n-propanol and mixtures thereof-, and
   c) not in excess of 15% by volume of the total composition of a coupling agent consisting of oleic acid and an organic ester component selected from the group consisting of $C_1$–$C_4$ alkyl esters of fatty acids selected from the group consisting of oleic acid, tallow fatty acid and coconut fatty acid and mixtures thereof;
   wherein the fatty acid in the ester of a fatty acid is derived from natural oils and fats or synthetic oils or any mixtures thereof; and
   wherein the alcohol component and the coupling agent are present in respective amounts of from about 25:1 to about 1:1.

2. A miscible fuel blend composition according to claim 1 wherein the coupling agent is between about 1.5–11% by volume of the total composition.

3. A miscible fuel blend composition according to claim 1 wherein the coupling agent is between about 2–5% by volume of the total composition.

4. A miscible fuel blend composition according of claim 1 wherein the natural oils and fats are lard and tallow.

5. A miscible fuel blend composition according to claim 1 wherein the natural oils are vegetable oils which are derived from the canola, palm, corn, sunflower, rape or soya bean oils.

6. A miscible fuel blend composition according to claim 1 wherein the esters of acids are selected from the group consisting of ethyl oleate, methyl oleate, ethyl tallowate, iso-propyl oleate, butyl oleate and methyl cocoate.

7. A miscible fuel blend composition according to claim 1 wherein the hydrocarbon liquid is present in an amount between 75–85% by volume of the total composition.

8. A fuel additive composition for and miscible with a hydrocarbon selected from the group consisting of diesel oil, gas oil and mixtures thereof consisting essentially of a) an alcohol component selected from the group consisting of ethanol, n-propanol and mixtures thereof and b) a coupling agent consisting of oleic acid and an organic ester selected from the group consisting of $C_1$–$C_4$ alkyl esters of fatty acids selected from the group consisting of oleic acid, tallow fatty acid and coconut fatty acid and mixtures thereof, wherein the fatty acid in the ester of a fatty acid is derived from natural oils and fats or synthetic oils or any mixtures thereof, and wherein the alcohol component and the coupling agent are present in respective amounts ranging from a ratio of about 25:1 to 1:1.

* * * * *